US012514150B2

(12) United States Patent
Ryan et al.

(10) Patent No.: US 12,514,150 B2
(45) Date of Patent: Jan. 6, 2026

(54) SECTION CONTROL SYSTEM

(71) Applicant: Ausplow Pty. Ltd., Cockburn Central WA (AU)

(72) Inventors: John William Ryan, Cockburn Central WA (AU); Brett Forbes Lovell, Cockburn Central WA (AU)

(73) Assignee: AUSPLOW PTY. LTD., Cockburn Central Wa (AU)

( * ) Notice: Subject to any disclaimer, the term of this patent is extended or adjusted under 35 U.S.C. 154(b) by 152 days.

(21) Appl. No.: 18/452,844

(22) Filed: Aug. 21, 2023

(65) Prior Publication Data

US 2024/0057513 A1 Feb. 22, 2024

(30) Foreign Application Priority Data

Aug. 22, 2022 (AU) .................. 2022902397

(51) Int. Cl.
*A01C 7/08* (2006.01)
*A01C 7/06* (2006.01)

(52) U.S. Cl.
CPC .............. *A01C 7/084* (2013.01); *A01C 7/06* (2013.01)

(58) Field of Classification Search
CPC ................................................... A01C 7/084
USPC ........................................................ 111/175
See application file for complete search history.

(56) References Cited

U.S. PATENT DOCUMENTS

| 6,290,433 B2 * | 9/2001 | Poncelet | A01C 7/082 |
| | | | 406/181 |
| 7,555,990 B2 | 7/2009 | Beaujot | |
| 7,690,440 B2 | 4/2010 | Dean et al. | |
| 8,656,848 B2 * | 2/2014 | Hubalek | A01C 7/084 |
| | | | 340/684 |
| 10,779,460 B2 * | 9/2020 | Pirkenseer | A01C 7/084 |

(Continued)

FOREIGN PATENT DOCUMENTS

| AU | 528237 B2 | 4/1983 |
| AU | 541415 B2 | 1/1985 |

(Continued)

OTHER PUBLICATIONS

UK Office Action and Search Report for corresponding Application No. GB2312465.4, dated Feb. 6, 2024, 5 pgs.

*Primary Examiner* — Joseph A Dillon, Jr.
(74) *Attorney, Agent, or Firm* — Tarolli, Sundheim, Covell & Tummino LLP

(57) ABSTRACT

An assembly is provided to distribute flowable particulate material, and includes a conduit to which the material is delivered and to which an airstream is supplied to move the material along the conduit to a delivery downstream destination, a separator, within the conduit, to engage the airstream to concentrate the material in a concentrated portion of the airstream by separating a portion of the airstream, an output connected to the conduit downstream of the separator to receive the flowable particular material and deliver the material to the downstream destination, and an air distribution head in constant fluid communication with the separator to receive the separated portion of the air stream and also in constant fluid communication with the output to assist the delivery of the flowable particulate material by the output to the downstream destination by delivering the separated portion of the air stream to the output.

6 Claims, 8 Drawing Sheets

(56) References Cited

U.S. PATENT DOCUMENTS

| | | | |
|---|---|---|---|
| 11,352,222 B2* | 6/2022 | Trushin | B65G 53/60 |
| 11,930,735 B2* | 3/2024 | Jagow | A01C 7/084 |
| 12,193,353 B2* | 1/2025 | Wien | A01C 7/084 |
| 2012/0230779 A1* | 9/2012 | Dunstan | A01C 7/081 |
| | | | 406/171 |
| 2012/0301231 A1 | 11/2012 | Jagow et al. | |
| 2016/0157418 A1* | 6/2016 | Henry | A01C 7/084 |
| | | | 701/50 |
| 2017/0257999 A1 | 9/2017 | Ryan | |
| 2018/0317379 A1* | 11/2018 | Pirkenseer | A01C 7/084 |
| 2020/0010286 A1 | 1/2020 | Roberge et al. | |
| 2020/0045877 A1* | 2/2020 | Riffel | A01C 7/082 |
| 2021/0053774 A1 | 2/2021 | Trushin | |
| 2023/0109764 A1* | 4/2023 | Asche | A01C 7/084 |
| | | | 239/8 |
| 2023/0133821 A1* | 5/2023 | Wien | A01C 7/084 |
| | | | 111/174 |

FOREIGN PATENT DOCUMENTS

| | | |
|---|---|---|
| AU | 640025 B2 | 8/1993 |
| AU | 675376 B2 | 1/1997 |
| AU | 2007202357 A1 | 1/2008 |
| AU | 2016265961 A1 | 9/2017 |
| AU | 2020220166 A1 | 3/2021 |
| CA | 2559626 A1 | 8/1999 |

* cited by examiner

SECTION CONTROL SYSTEM

RELATED APPLICATIONS

The present application claims convention priority from Australian Provisional Patent Application No. 2022902397, the contents of which are incorporated herein in their entirety by reference thereto.

FIELD

The present invention relates to assemblies that use air to distribute granular material (particulate material), and more particular, but not exclusively, to air systems that deliver seed and/or fertiliser to plough assemblies of a plough.

BACKGROUND

Previously, seed and/or fertiliser is delivered to the plough assemblies of a plough by air systems. Existing plough assemblies are described in Australian Patents 528237, 541415, 640025, 675376 and 2007202357, as well as Australian Patent Applications 2011201476 and 2014218387.

More recently, further plough assemblies have been described in Australian Patent Application 2016265961 (U.S. Ser. No. 15/406,239—A Seeding Tool).

Seeding is typically done by at least two pieces of equipment, the air seeder or 'bin' and the seeder bar or 'bar'. The tillage bar has tool bars to which are affixed tines for subsoil cultivation and preparing a seed bed and placing the seed. The bin is either before or pulled after the bar and it has tanks which carry seed and fertiliser 'product'. The air seeder then paddles the product or meters a calibrated amount into one or more air streams where it firstly transported and then distributed to the outlets on the bar.

The seeder bars may be quite wide and in some cases, up to 24 metres. For large paddocks the seeder bars go up and back and but stop seeding before the end of the paddock so the rig may be turned around and go back the other way. This necessitates that the seeding be stopped before the end of the paddock so that there is space to turn the machine around. Once the up and back seeding is complete it is usual to do a few laps around the outer edge of the paddock filling in all the unseeded areas. Also, it may not be possible to seed properly where there are obstacles such as trees and rocky outcrops and the machine has to seed over what has already been seeded. It is preferable to seed rather than miss out a section due to firstly lost cropping area and that the crop controls the weeds by way of competition necessitating less chemical spraying.

Described in U.S. Pat. No. 7,690,440B2 are multiple metering wheels in the metering unit which are shut off to the product by use of a sliding door above the wheel. This then stops the wheel being able to meter the product into one of the smaller diameter lines that run to the bar before further division and arriving at the tine. However, one drawback with this is that often there is enough product especially canola to seed many hectares (at 1 kg/Ha) before the product stops. There is another system which is a variation on this and may be patented. Instead of shutting a door above the metering wheel they disconnect the metering wheel from the drive by use of a clutch mechanism of some type. This is both complicated and necessitates the metering wheels all be driven by individual clutches. Typically, this is done with a gear that is slotted in and out which is actuated pneumatically.

Described in U.S. Pat. No. 7,555,990B2 is a head with a valve incorporated. The product is re-directed from the bar back towards the bin. This is complex, requiring extra hosing back to the bin and also is not suitable where mixed products are used in one line. For example, it is possible with most systems to add some starter fertiliser to the seed so having a mixture of product. Which tank would this mixture of product be returned too.

A sectional control system is described in US Patent Publication 2012/0301231A1. The primary head is described as upside down 'head at bottom' on their bin. The primary head is located where the outlet to the bar is shot and takes re-directed 'clean' air from the inside a bend on the primary riser and send it out to the bar. Multiple lines run to the bar and have a system with elbows and actuators that is complicated. Another sectional control system is described in Australian Patent Application No. 2020220166, however due to the small distance between the air distribution head and primary manifold in that design, there is a risk that material may fall from the primary manifold back down into the air distribution head and, without the linear momentum, enter the air conduits.

A disadvantage of the above system is that product can become trapped in the head as it is upside down. This affects distribution of the seed. Also, the shut off system is close to the bin such that it can take up to 5-8 seconds for all of the product to work its way out of the air system. Typically, at 8 km/hr this is around 10 or more metres where the bar is still seeding.

SUMMARY

It is an object of the present invention to at least substantially address one or more of the above disadvantages, or at least provide a useful alternative to the above discussed systems.

In a first aspect the present invention provides an assembly to distribute flowable particulate material, the assembly including:
  a conduit to which the material is delivered and to which an airstream is supplied to move the material along the conduit to a delivery downstream destination;
  a separator to engage the airstream to concentrate the material in a concentrated portion of the airstream by separating a portion of the airstream, the separator being positioned within the conduit;
  an output connected to the conduit downstream of the separator to receive the flowable particular material and deliver the material to the downstream destination;
  an air distribution head in constant fluid communication with the separator to receive the separated portion of the air stream and also in constant fluid communication with the output to assist the delivery of the flowable particulate material by the output to the downstream destination by delivering the separated portion of the air stream to the output;
  a control device operatively associated with the output to selectively deliver a predetermined rate of the material to the downstream destination; and
  a mixing conduit located between the separator and the output, the mixing conduit being adapted to guide the concentrated portion of the airstream to the output and being dimensioned to allow the material in the concentrated portion of the airstream to mix more evenly.

Preferably, the mixing conduit includes a device to induce turbulence in the concentrated portion of the airstream to accelerate a mixing of the material in the concentrated portion of the airstream.

Preferably the device to induce turbulence includes one or more rings mounted within the mixing conduit to protrude into the mixing conduit.

Preferably the device to induce turbulence includes one or more dimples formed in the mixing conduit.

Preferably the mixing conduit has a length of between 2 to 4 times a diameter of the mixing conduit.

Preferably the length of the mixing conduit is about 3 times the diameter of the mixing conduit.

Preferably the material delivered by the output to the downstream destination travels in an opposite output direction to the input direction in which the airstream is supplied to the conduit;

wherein the control device is located away from the air distribution head in the input direction; and wherein the control device includes a sliding gate valve.

BRIEF DESCRIPTION OF THE DRAWING

Preferred embodiments of the present invention will now be described by way of example, with reference to the accompanying drawings, wherein.

DETAILED DESCRIPTION

Figure 1:
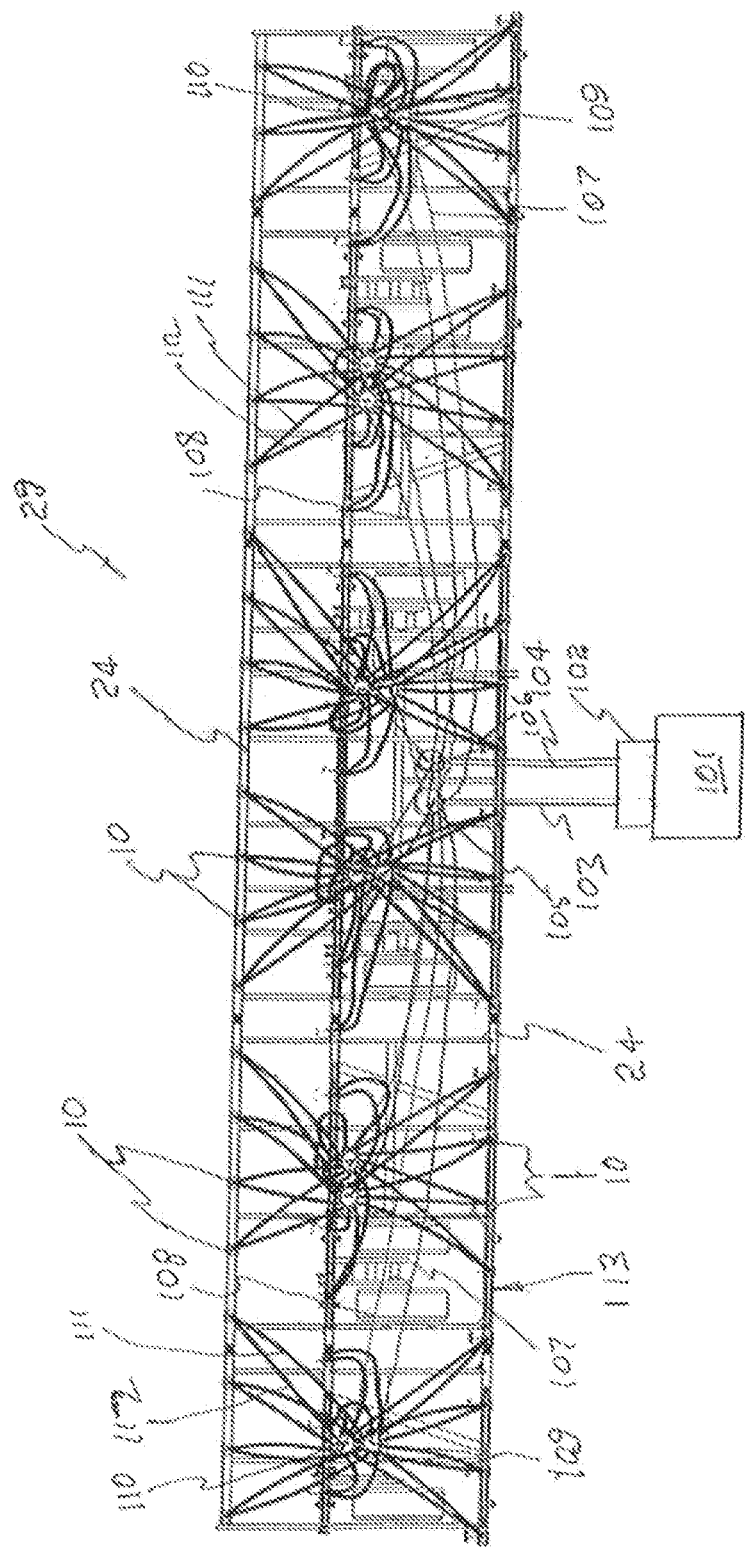
FIG. 1 is a schematic top plan view of a plough incorporating a plough frame and a plurality of plough assemblies.

In the accompanying drawings there is schematically depicted a plough 29 having a plurality of plough assemblies 10. Each plough assembly 10 is intended to be attached to a plough frame 30 that includes a pair of transverse beams 24 engaged by a clamp 11 (FIG. 2) of each assembly 10. Typically, the frame 30 would have attached to it a plurality of the assemblies 10, and would be drawn in a forward direction 12 by a prime mover such as at tractor. Each assembly 10 would be moved through a soil layer 27 having an upper surface 13.

Figure 2:
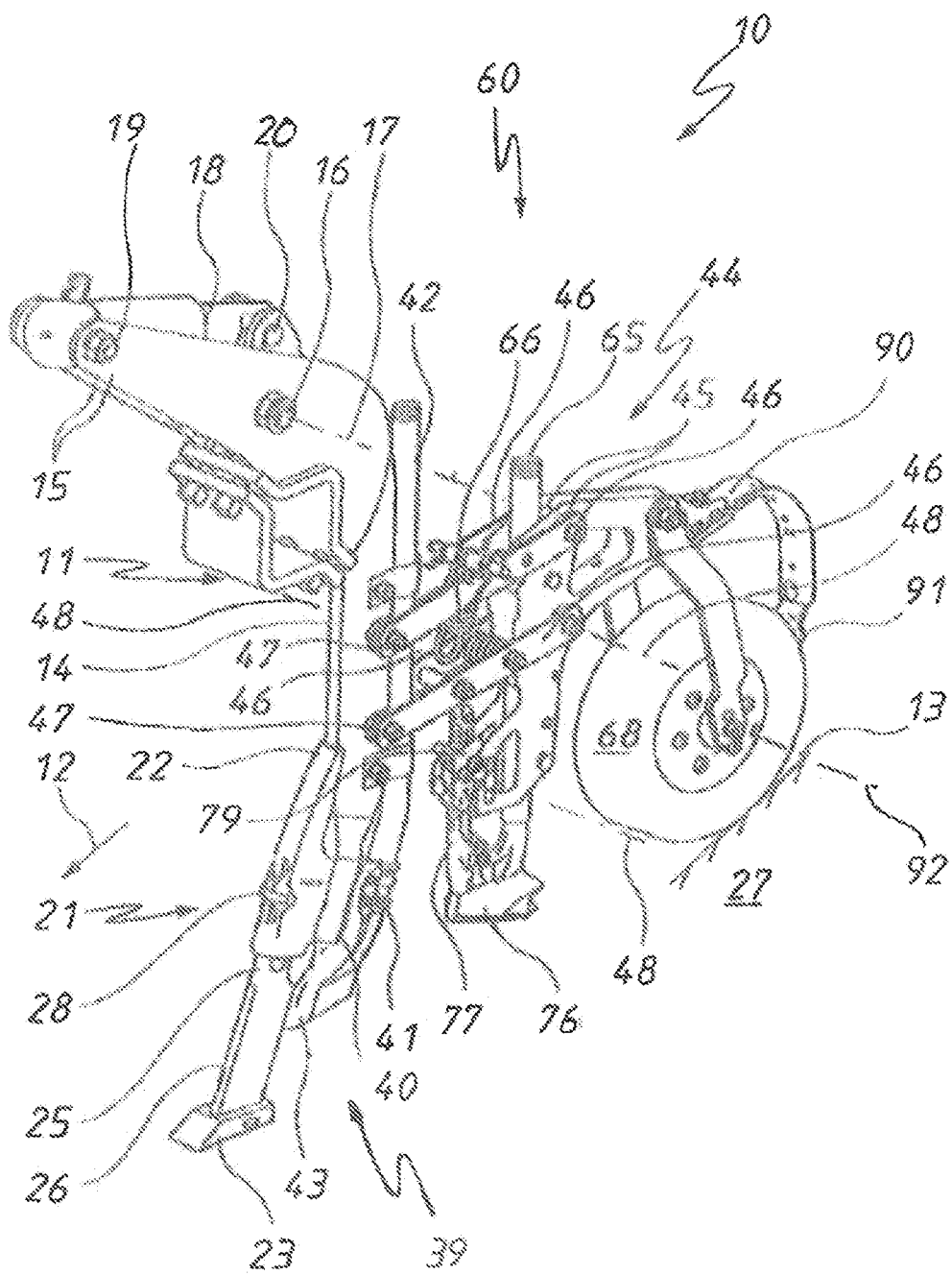
FIG. 2 is a schematic isometric view of a plough assembly of the plough of FIG. 1.

Supported by the clamp 11 is a digging and seeding assembly 60. The assembly 60 includes a digging shank (tine) 14 pivotally attached to the clamp 11 by a pair of brackets 15 fixed to the clamp 11. The shank 14 is pivotally attached to the brackets 15 by means of a pivot pin (bolts) 16 so that the shank 14 can pivot about the generally horizontal transverse axis 17. The axis 17 is generally perpendicular to the direction 12. Extending between the shank 14 and the brackets 15 is a hydraulic ram 18 that urges the shank 14 to a predetermined digging position as shown in FIG. 2. However, when an obstacle is encountered, the shank 14 is allowed to pivot rearwardly in a direction opposite the direction 12 about the axis 17, by contraction of the ram 18. Once the obstacle has passed, the ram 18 causes the shank 14 to move to its operative predetermined digging position as shown in FIG. 2.

The ram 18 is pivotally attached to the brackets 15 by means of a pivot pin (bolt) 19, while the ram 18 is pivotally attached to the shank 14 by means of a pivot pin (bolt) 20. The pins 19 and 20 provide for pivoting movement about axes parallel to the axis 17.

Attached to a lower portion of the shank 14 is a digging assembly 21. The digging assembly 21 includes a mounting member 22 and a digging blade 23.

The mounting member 22 includes an upwardly extending cavity within which there projects a digging blade part 25, to a lower end of which there is attached the blade 23. Typically, the part 25 would include a forward-facing portion 26 formed of harder material that would resist wear.

The shank 14 locates the part 25 so that it projects below the surface 13 to locate the blade 23 at a desired position in the soil layer 27.

The mounting member 22 receives a pin 28 that passes through passages in the mounting member 22 to engage in a selected pair of slots. In that regard it should be appreciated that pairs of slots are formed in each side of the part 25, with the pin 28 engaging the selected slots to adjust the height of the blade 23 relative to the shank 14, and therefore the distance below the surface 13.

The lower portion of the part 25 is provided with a projection that extends into a passage in the blade 23. The projection has a pair of rearwardly extending slots 32 that receive a pin to secure the blade 23 to the part 25. In particular, the blade 23 has a rearwardly facing aperture through which the pin is inserted to locate the pin in the slots to fix the blade 23 to the part 25. In particular, the blade 23 has slots that also receive the pin to fix the blade 23 to the part 25.

The blade 23 includes a body with a leading portion to which there is attached wear plates. The wear plates are forward facing and have leading surfaces inclined to the direction 12, by an acute angle, so as to be upwardly and forwardly facing. The blade body has an upwardly facing surface that slopes upwardly to the rear at an acute angle the upwards facing surface 49 engages the soil after it has been engaged by the surfaces of wear plates. The angle is relative to the horizontal and the soil surface 13, and is about 5°.

Also attached to the shank 14 is a fertiliser delivery assembly 39 that delivers fertiliser to the trough formed by the blade 23.

The fertiliser assembly 39 includes a mounting member 40 attached to the shank 14 by threaded fasteners. The assembly 39 includes a tubular part 41 to which there is attached a tube 42 to which there is delivered fertiliser. The tube 42 communicates with a fertiliser boot 43 that is hollow and receives the fertiliser and delivers the fertiliser to the soil trough being formed by the blade 23.

Also attached to the shank 14 is a seeding assembly 44. The seeding assembly 44 includes parallel mounting plates 45 that are maintained in a generally upright orientation, and attached to the shank 14 by a parallelogram mechanism including four links 46. The links 46 are arranged in pairs, including an upper pair and a lower pair, with all the links 46 being maintained parallel. Each link 46 is pivotally attached to the shank 14 and the plates 45 by transverse bolts (pins) 47 so that each link 46 pivots relative to the shank 14 and plates 45 about the generally horizontal transverse axes 48. The axes 48 are generally perpendicular to the direction 12.

Due to the parallelogram arrangement of the links 46, the plates 45 are maintained in their generally upright orientation during pivoting movement of the links 46.

Attached to the plates 45 is a seeding boot 76 by means of a support member 77. The support member 77 is attached to the seeding boot 76 by transverse bolts. The member 77 engages a mounting 79.

The mounting 79 is attached to the plates 45 by transverse bolts (not illustrated).

Extending to the boot 76 is a seed delivery tube 65, to which seed is delivered for delivery to the duct in the boot 76.

A spring 66 extends between the upper links 46 and the shank 14 to urge the seeding assembly 44 downward. Tension in the spring 66 is adjustable.

Extending rearwardly from and fixed to the plates 45 is a mounting member 90 to which a press wheel 68 is attached. A scraper 91 engages the radial outer surface of the wheel 68 to remove soil therefrom. The wheel 68 is rotatable about a transverse horizontal axis 92 that is parallel to the axes 48.

The wheel 68 engages the soil surface 13 to maintain the boot 76 at a desired depth.

The above assembly 10 is more fully described in Australian Patent Application 2016265961 (U.S. patent application Ser. No. 15/406,239).

With particular reference to FIG. 1, the plough 29 further includes a bin 101 that stores seed and/or fertiliser. In this embodiment, the bin 101 separately stores seed and fertiliser. Associated with the bin 101 is a motor and air supply (blower) assembly 102.

Extending from the assembly 102 and bin 101 is a primary conduit 103 that receives fertiliser, with the fertiliser being moved along the primary conduit 103 by air provided by the assembly 102. A primary conduit 104 extending from the air supply 102 and bin 101 receives seed that is moved along the primary conduit 104 by air provided by the assembly 102.

The primary conduit 103 extends to a primary manifold 105, while the primary conduit 104 extends to a primary manifold 106. Extending from the primary manifold 105 is a plurality of secondary conduits 107 that receive fertiliser from the primary manifold 105.

Extending from the primary manifold 106 is a plurality of secondary conduits 108 to which seed is delivered from the primary conduit 106.

Each of the secondary conduits 107 extends to a secondary manifold 109, while each of the secondary conduits 108 extends to a secondary manifold 110. As can be seen in FIG. 1, there is a plurality of the secondary manifolds 109 and 110.

Extending from each of the secondary manifolds 109 is a plurality of delivery conduits 111, while extending from each of the secondary manifolds 110, is a plurality of delivery conduits 112. Each of the delivery conduits 111 and 112 extends to an associated plough assembly 10. In this embodiment, each delivery conduit 111 extends to a respective one of the tubes 42 to deliver fertiliser thereto. Each of the delivery conduits 112 extends to a respective one of the tubes 65 to deliver seed thereto.

In this embodiment, the primary manifolds 105, 106, are substantially identical. In the following description in respect of FIGS. 3 to 9, the granular material distribution assembly 113 will be described as incorporating primary conduit 104, primary manifold 106, and secondary conduit 108.

As described previously, and with reference to FIG. 1, the primary conduit 104 receives granular material, or seed, from the assembly 102 with air flow causing movement of the seed.

Figure 3:
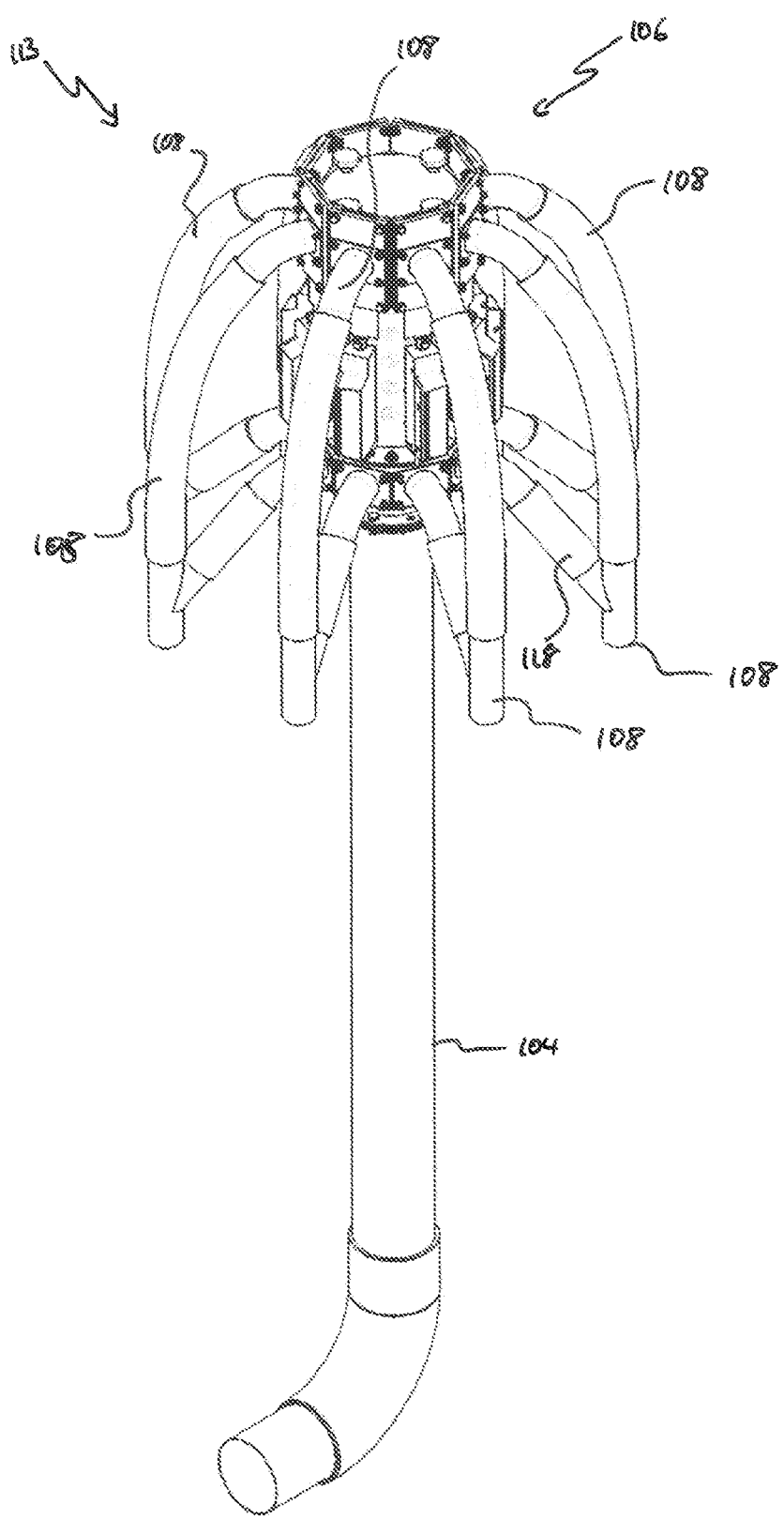
FIG. 3 is an isometric view of a material distribution assembly according to a preferred embodiment of the invention.
Figure 4:
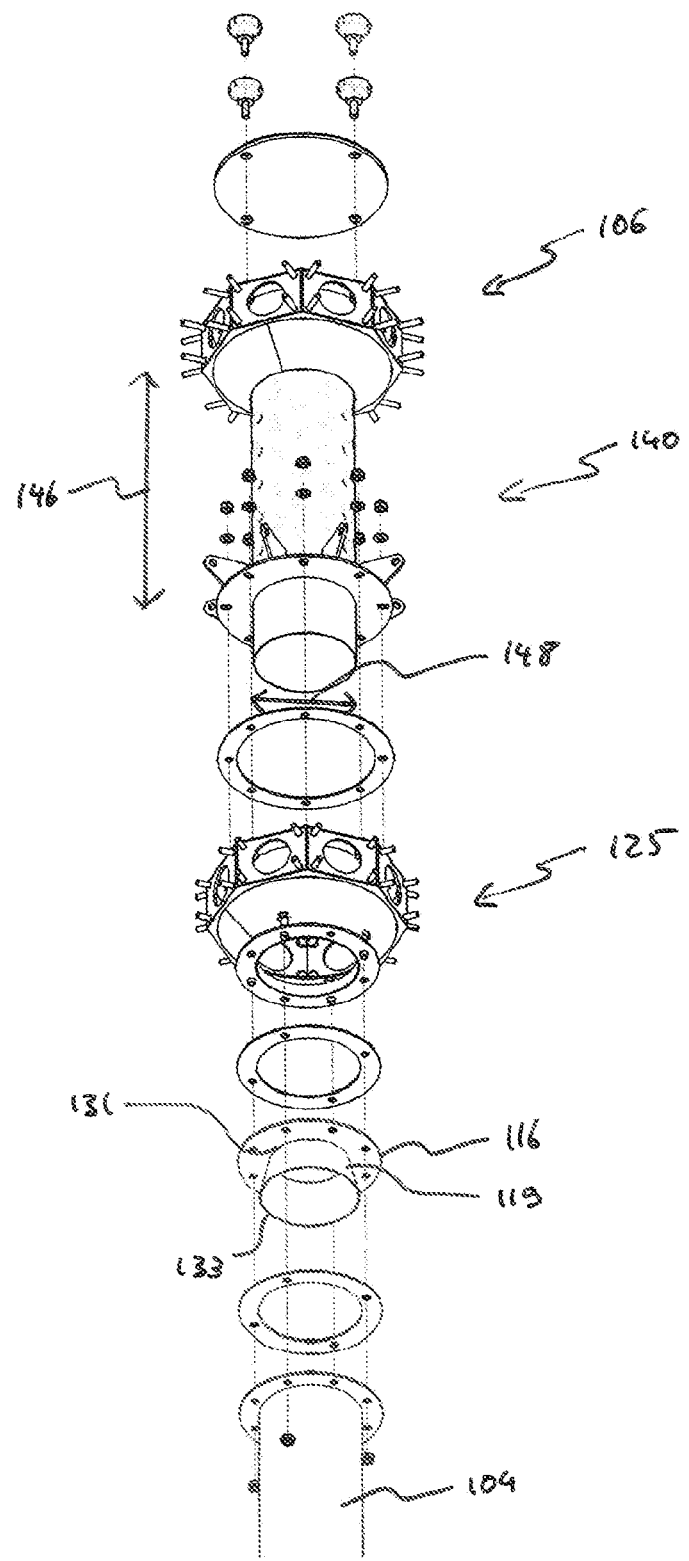
FIG. 4 is an exploded view of a portion of the material distribution assembly of FIG. 3.
Figure 5:
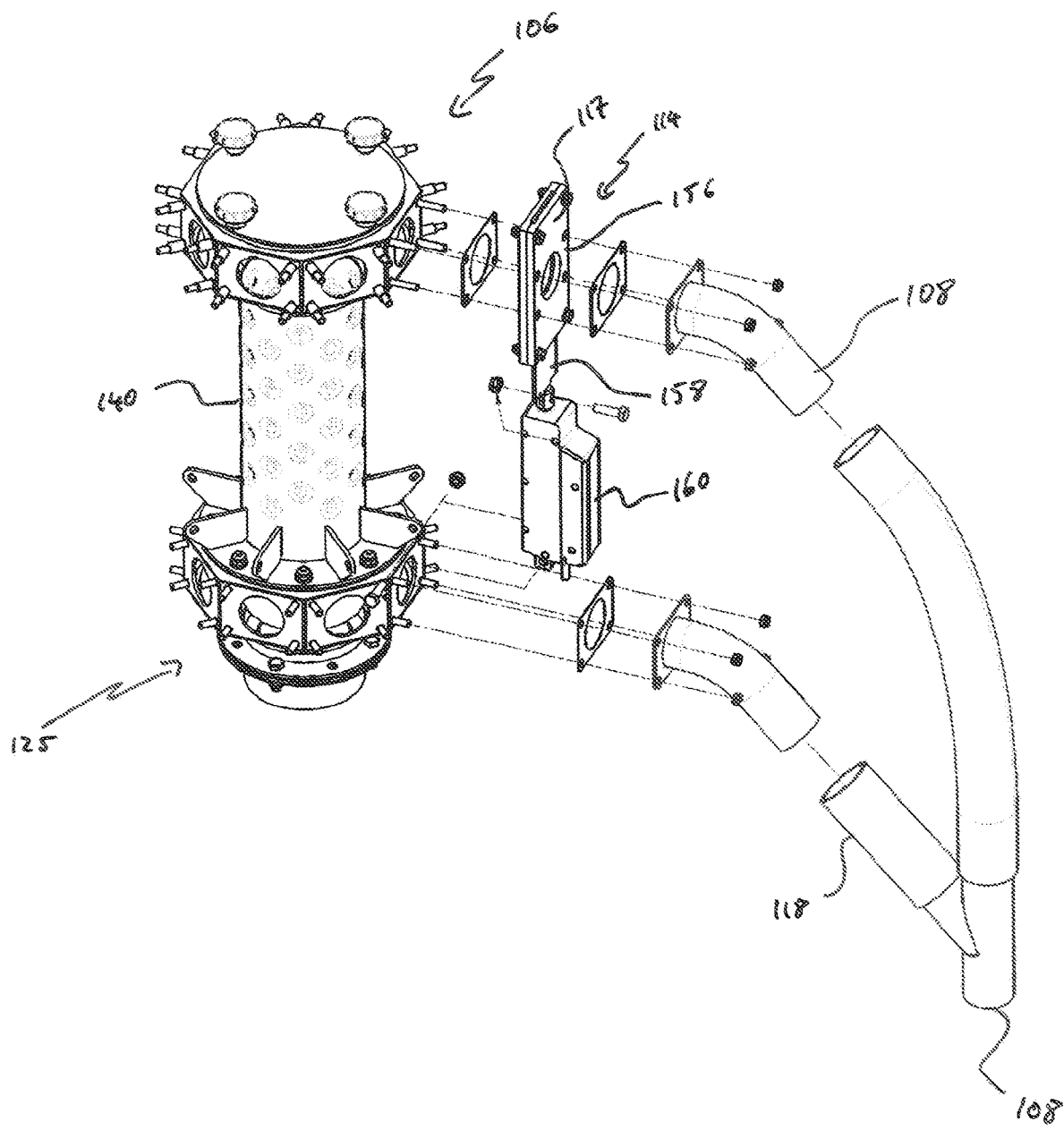
FIG. 5 is an exploded view of a portion of the material distribution assembly of FIG. 3.

FIGS. 3 to 9 show an assembly 113 to distribute flowable particulate (granular) material, for example, seed. The primary conduit 104 extends to a product distribution head, or primary manifold 106 from where the seed is then distributed to the output, or secondary conduits 108. As shown in FIG. 4, a separator 116 is located within the conduit 104 to concentrate the material in a concentrated portion of the airstream by separating a portion of the airstream. As shown in FIG. 5, an air distribution head 125 is in constant fluid communication with the separator 116 to receive the separated portion of the airstream. The air distribution head 125 is also in constant fluid communication with respective air conduits 118 to distribute the separated portion of the airstream air through the air conduits 118 for reentry into the material within the secondary conduits 108. A control device with control valve 114 controls flow of the material through each secondary conduit 108. The separated portion of the airstream is re-introduced into the material downstream of the control valve 114.

Figure 9:
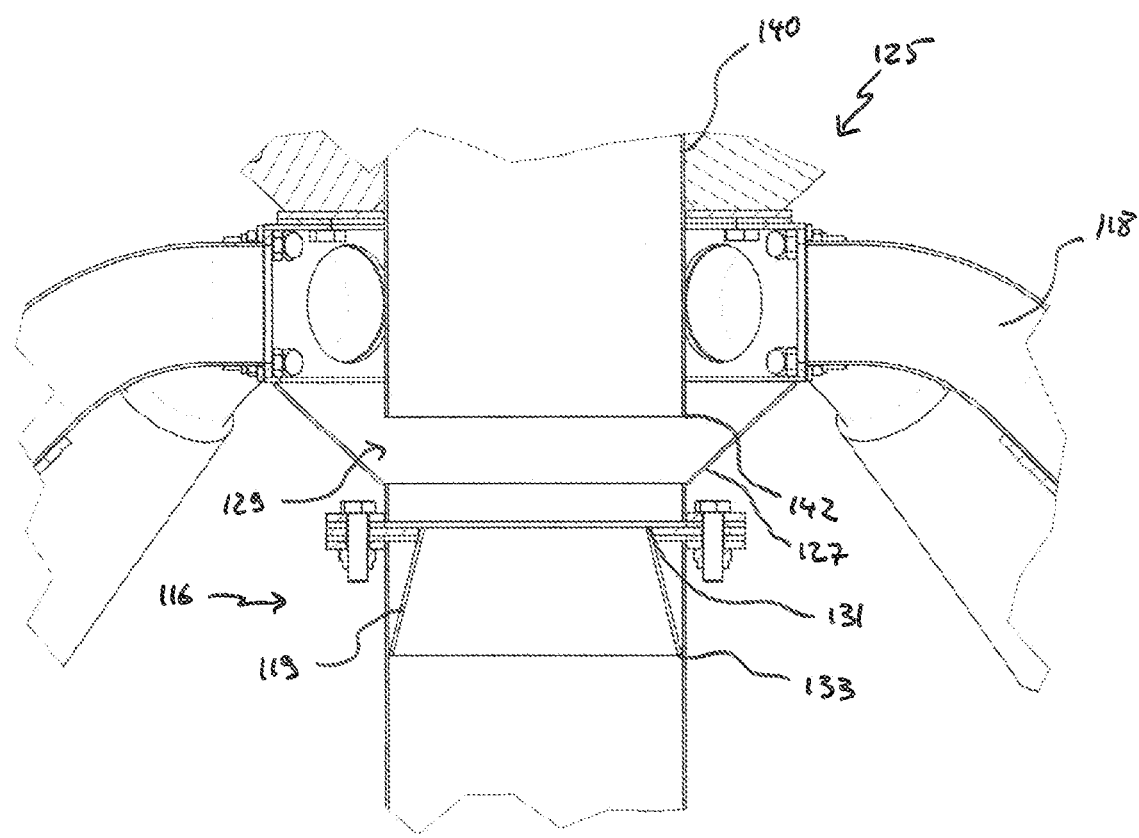
FIG. 9 is detail E of FIG. 6.

Referring to FIG. 4, the primary conduit 104 includes an accelerator portion 119 in the form of an insert having a first cross-sectional area 133 and constricting to an upstream cross-sectional area 131, best shown in FIG. 9. The decrease in cross-sectional area toward the primary manifold 106 increases the velocity and momentum of the material through the separator 116 using the Bernoulli principle. Material is concentrated in a concentrated portion of the airstream, specifically towards a center of the conduit 104, and being too heavy to change direction continues toward the primary manifold 106. Once arrived at the primary manifold 106, the concentrated portion of the airstream is selectively distributed through the control valve 114 into each secondary conduit 108, or output. In the embodiment of FIG. 3, the control valve 114 includes a sliding gate valve 117. The airstream re-enters the secondary conduit 108 via the air conduit 118 connected to the secondary conduit 108 downstream of the control valve 114. As shown in FIG. 5, the connection of the air conduit 118 to the secondary conduit 108 is at an obtuse angle α to ensure material, or seed, does not enter the air conduit 118. The material and airstream travel through the output 108 to the downstream destination in an output direction 154.

Returning briefly to FIG. 4, the assembly 113 further includes a mixing conduit 140 located between the separator 116 and the output 108. The mixing conduit 140 is adapted to guide the concentrated portion of the airstream to the output 108, by transporting it towards the primary manifold 106. As shown in FIG. 9, a lower opening 142 of the mixing conduit 140 is surrounded by outwardly sloping walls 127 of the air distribution head, creating a gap 129. The concentrated portion of the airstream maintains its movement in an input direction 144, while the separated portion of the airstream travels through the gap 129 into the air conduits 118. The mixing conduit 140 has a length 146 to allow the material in the concentrated portion of the airstream to mix more evenly, such that the amount of material admitted by the control valve 114 for each output 108 is more equally distributed between the different control valves 114 and outputs 108 connected to the primary manifold 106. Preferably, the length 146 of the mixing conduit 140 is between 2 to 4 times a diameter or width 148 of the mixing conduit 140. More preferably, the length 146 is about 3 times the diameter of the mixing conduit 140.

In the embodiment shown in FIGS. 3 to 6 the input direction 144 and output direction 154 are in opposite directions. Further, the control valve 114 is located away from the air distribution head 125 in the input direction, and preferably includes a sliding gate valve 117.

Figure 6:
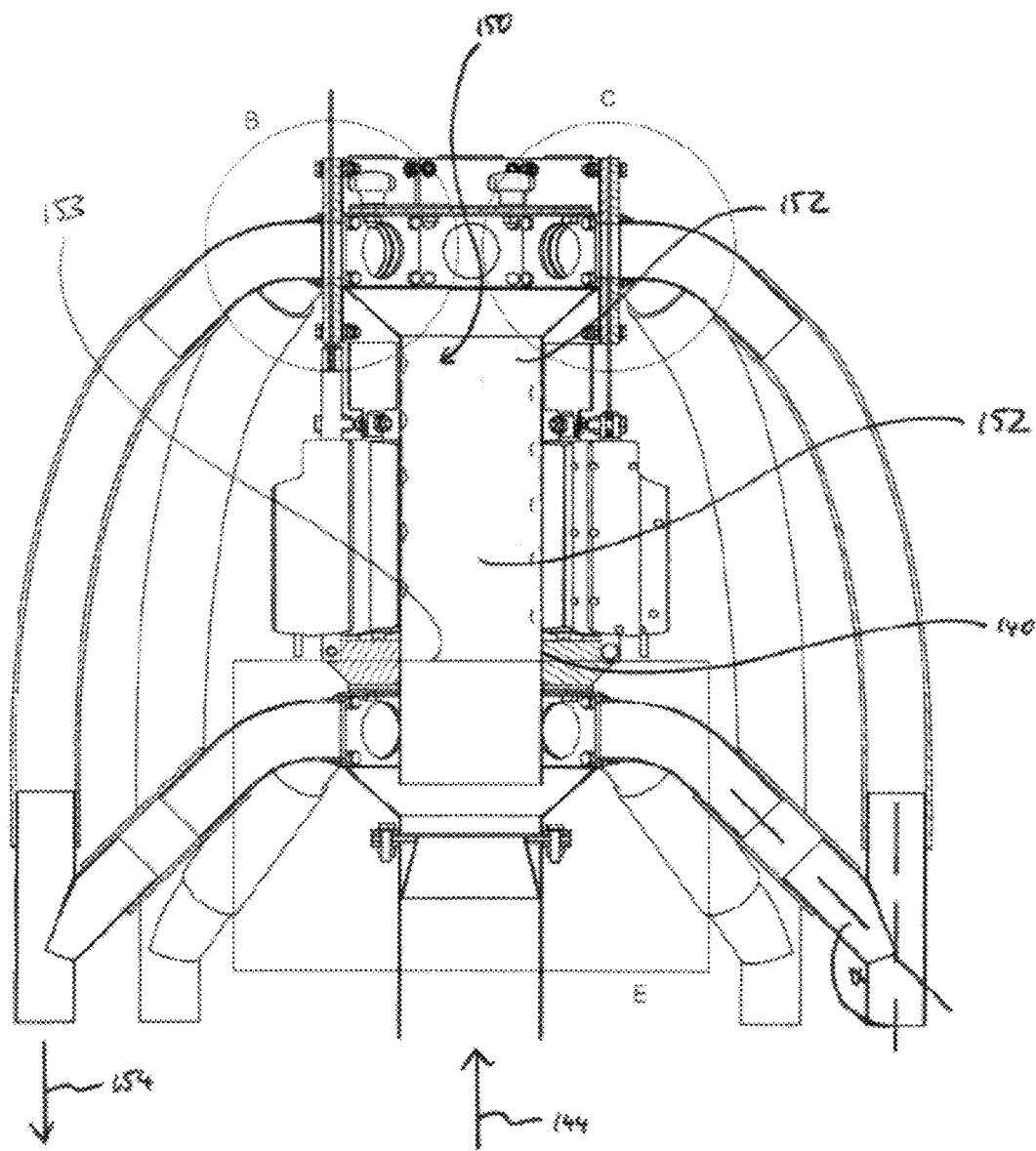
FIG. 6 is a section view of the material distribution assembly of FIG. 3.

Moving to FIG. 6, the mixing conduit 140 includes a turbulence generator 150, or device to induce turbulence in the concentrated portion of the airstream. The turbulence accelerates mixing of the material in the concentrated portion of the airstream.

In the embodiment shown in FIGS. 3 to 9, the turbulence generator 150 includes one or more dimples 152 formed in the mixing conduit 140. In another embodiment, the turbulence generator 150 may include one or more rings 153 mounted within the mixing conduit 140 to protrude into the mixing conduit 140.

Figure 7:
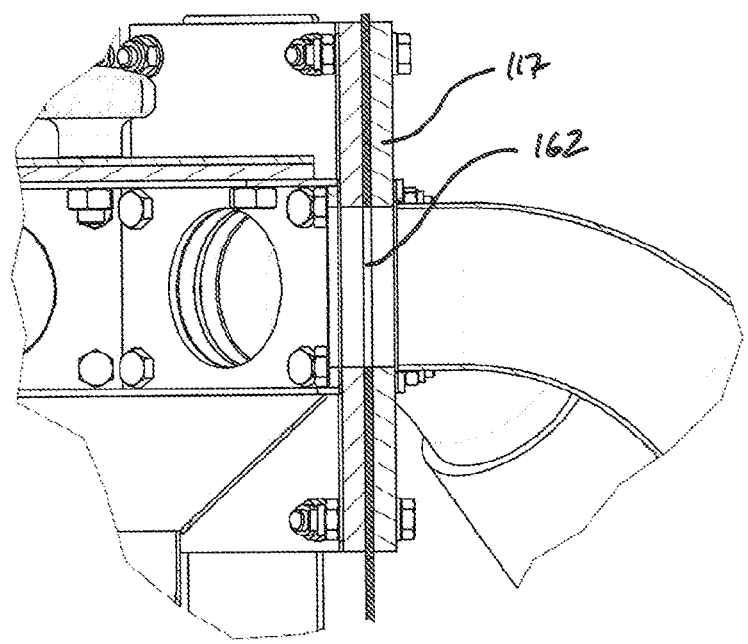
FIG. 7 is detail C of FIG. 6.
Figure 8:
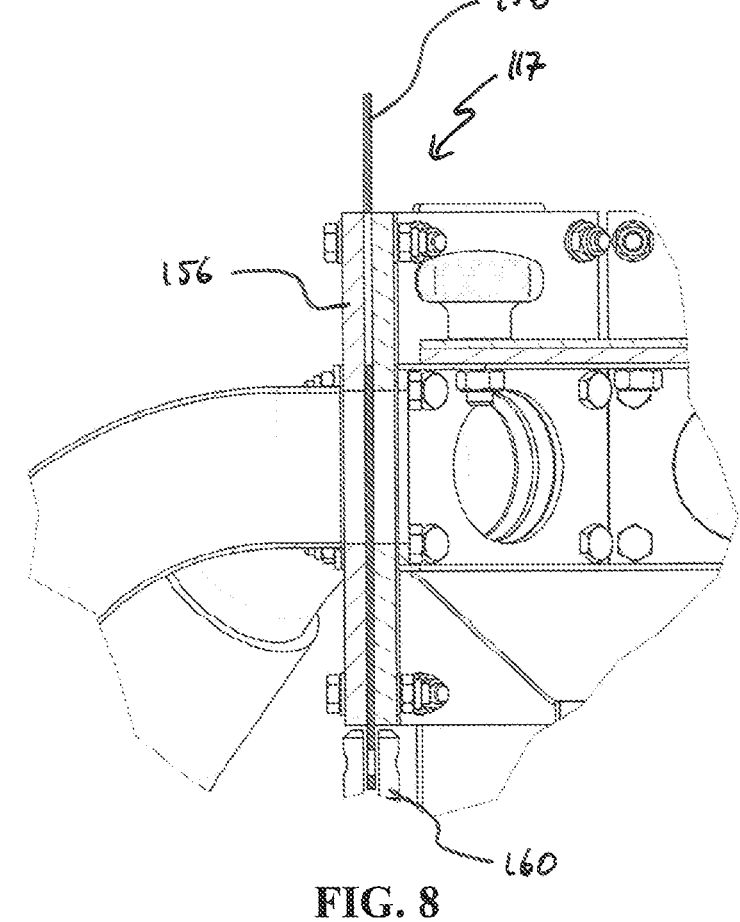
FIG. 8 is detail B of FIG. 6.

Moving to FIGS. 7 and 8, which show the movement of the sliding gate valve 117 for each output 108 between an open state, shown in FIG. 7, and a closed state, shown in FIG. 8. By individual actuation of the sliding gate valve 117, the flow of material into each output 108 can be individually controlled. For example, only one output 108 could be receiving material from the primary manifold 106, or several outputs 108 could be receiving material from the primary manifold 106, or no output 108 could be receiving material from the primary manifold. The sliding gate valve 117 includes a valve body 156, that sealingly contains a valve member 158 that is movable between an open position shown in FIG. 7, where a hole 162 in the valve member aligns with the output 108, and a closed position shown in FIG. 8, where the valve member 158 blocks the output 108. The valve member 158 is moved between the open and closed positions by a linear actuator 160.

The control valves 114 are installed on outlets of the primary manifold 106. The control valves 114 may be operated in a closed loop with product delivery sensors (not shown) to allow for extra control over seed distribution. This can be used to compensate for random variations in geometry or changes in the flow vortex structure and may be particularly useful when the tractor is moving on a curved path.

| Integers: | |
|---|---|
| 10 | plough assemblies |
| 11 | clamp |
| 12 | forward direction |
| 13 | upper surface |
| 14 | tine/digging shank |
| 15 | brackets |
| 16 | pivot pin |
| 17 | transverse axis |
| 18 | hydraulic ram |
| 19 | pivot pin |
| 20 | pivot pin |
| 21 | digging assembly |
| 22 | mounting member |
| 23 | digging blade |
| 24 | transverse beams |
| 25 | digging blade part |
| 26 | forward facing portion |
| 27 | soil layer |
| 28 | pin |
| 29 | plough |
| 30 | plough frame |
| 32 | slots |
| 39 | fertiliser delivery assembly |
| 40 | mounting member |
| 41 | tubular part |
| 42 | tube |
| 43 | fertiliser boot |
| 44 | seeding assembly |
| 45 | parallel mounting plates |
| 46 | links |
| 47 | transverse bolts |
| 48 | horizontal transverse axes |
| 49 | upwards facing surface |
| 60 | digging and seeding assembly |
| 65 | seed delivery tube |
| 66 | spring |
| 68 | press wheel |
| 76 | seeding boot |
| 77 | support member |
| 79 | mounting |
| 90 | mounting member |
| 91 | scraper |
| 92 | horizontal axis |
| 101 | bin |
| 102 | blower assembly |
| 103 | primary conduit |
| 104 | primary conduit |
| 105 | primary manifold |
| 106 | primary manifold |
| 107 | secondary conduits |
| 108 | secondary conduits |
| 109 | secondary manifold |
| 110 | secondary manifold |
| 111 | delivery conduits |
| 112 | delivery conduits |
| 113 | assembly |
| 114 | control valve |
| 116 | separator |
| 117 | sliding gate valve |
| 118 | air conduits |
| 119 | accelerator portion |
| 125 | air distribution head |
| 127 | outwardly sloping walls |
| 129 | gap |
| 131 | upstream cross-sectional area |
| 133 | first cross-sectional area |
| 140 | mixing conduit |
| 142 | lower opening |
| 144 | input direction |
| 146 | length |
| 148 | diameter |
| 150 | turbulence generator |
| 152 | dimples |
| 154 | output direction |
| 156 | valve body |
| 158 | valve member |
| 160 | linear actuator |

The invention claimed is:

1. An assembly to move flowable particulate material, the assembly including:
   a conduit to which the material is delivered and to which an airstream is supplied to move the material along the conduit to a delivery downstream destination;
   a separator to engage the airstream to concentrate the material in a concentrated portion of the airstream by separating a separated portion of the airstream, the separator being positioned within the conduit;
   an output connected to the conduit downstream of the separator to receive the flowable particulate material and deliver the material to the downstream destination;
   an air distribution head in constant fluid communication with the separator to receive the separated portion of the air stream and also in constant fluid communication with the output to assist the delivery of the flowable particulate material by the output to the downstream destination by delivering the separated portion of the air stream to the output;

a control device operatively associated with the output to selectively deliver a pre-determined rate of the material to the downstream destination; and a mixing conduit located between the separator and the output, the mixing conduit being adapted to guide the concentrated portion of the airstream to the output and including a device to induce turbulence in the concentrated portion of the airstream to accelerate a mixing of the material in the concentrated portion of the airstream, wherein the device to induce turbulence includes one or more rings mounted within the mixing conduit to protrude into the mixing conduit.

2. The assembly of claim 1, wherein the mixing conduit has a length of between 2 to 4 times a diameter of the mixing conduit.

3. The assembly of claim 2, wherein the length of the mixing conduit is about 3 times the diameter of the mixing conduit.

4. The assembly of claim 1, wherein the material delivered by the output to the downstream destination travels in an opposite output direction to the input direction in which the airstream is supplied to the conduit;

wherein the control device is located away from the air distribution head in the input direction; and wherein the control device includes a sliding gate valve.

5. An assembly to move flowable particulate material, the assembly including:

a conduit to which the material is delivered and to which an airstream is supplied to move the material along the conduit to a delivery downstream destination;

a separator to engage the airstream to concentrate the material in a concentrated portion of the airstream by separating a separated portion of the airstream, the separator being positioned within the conduit;

an output connected to the conduit downstream of the separator to receive the flowable particulate material and deliver the material to the downstream destination;

an air distribution head in constant fluid communication with the separator to receive the separated portion of the air stream and also in constant fluid communication with the output to assist the delivery of the flowable particulate material by the output to the downstream destination by delivering the separated portion of the air stream to the output;

a control device operatively associated with the output to selectively deliver a pre-determined rate of the material to the downstream destination; and a mixing conduit located between the separator and the output, the mixing conduit being adapted to guide the concentrated portion of the airstream to the output and including a device to induce turbulence in the concentrated portion of the airstream to accelerate a mixing of the material in the concentrated portion of the airstream, wherein the device to induce turbulence includes one or more dimples formed in the mixing conduit.

6. An assembly to move flowable particulate material, the assembly including:

a conduit to which the material is delivered and to which an airstream is supplied to move the material along the conduit to a delivery downstream destination;

a separator to engage the airstream to concentrate the material in a concentrated portion of the airstream by separating a separated portion of the airstream, the separator being positioned within the conduit;

an output connected to the conduit downstream of the separator to receive the flowable particulate material and deliver the material to the downstream destination;

an air distribution head in constant fluid communication with the separator to receive the separated portion of the air stream and also in constant fluid communication with the output to assist the delivery of the flowable particulate material by the output to the downstream destination by delivering the separated portion of the air stream to the output;

a control device operatively associated with the output to selectively deliver a pre-determined rate of the material to the downstream destination; and a mixing conduit located between the separator and the output, the mixing conduit being adapted to guide the concentrated portion of the airstream to the output, wherein the mixing conduit has a length of between 2 to 4 times a diameter of the mixing conduit.

* * * * *